No. 700,452. Patented May 20, 1902.
E. STEMMLER.
BEE SWARM CATCHER.
(Application filed July 19, 1901.)
(No Model.)
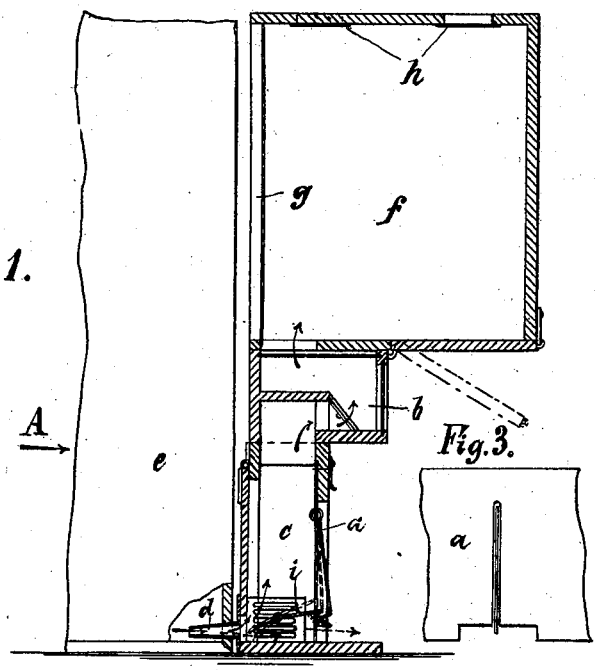
Fig. 1.
Fig. 3.
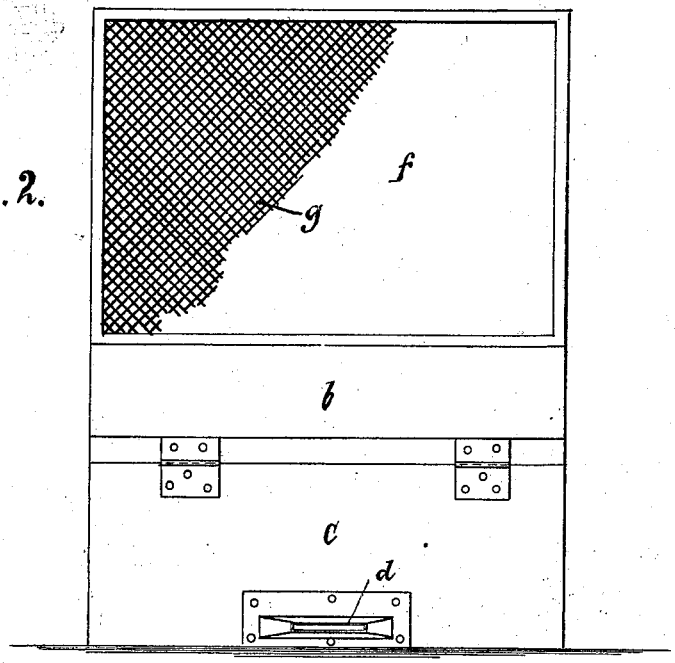
Fig. 2.
Witnesses
S. B. Brashears
H. C. Lyddane
Inventor
Ernst Stemmler
by G. Littman Atty.
THE NORRIS PETERS CO., PHOTO-LITHO., WASHINGTON, D. C.

UNITED STATES PATENT OFFICE.

ERNST STEMMLER, OF ZEULENRODA, GERMANY.

BEE-SWARM CATCHER.

SPECIFICATION forming part of Letters Patent No. 700,452, dated May 20, 1902.

Application filed July 19, 1901. Serial No. 68,946. (No model.)

*To all whom it may concern:*

Be it known that I, ERNST STEMMLER, a subject of the Emperor of Germany, residing at Zeulenroda, Reuss, Elder Line, Germany, have invented certain new and useful Improvements in Bee-Swarm Catchers, of which the following is a specification.

This invention relates to means for catching bees when swarming, and has for its object to provide an improved device for such purpose which will enable the user to catch the swarm and the drones and queen in separate compartments; and with this object in view the invention consists in the improved construction, arrangement, and combination of parts hereinafter fully described and afterward specifically claimed.

In the accompanying drawings, Figure 1 is a vertical sectional view of a construction embodying my invention, part of the hive being broken away. Fig. 2 is a view in elevation of the swarm-catcher and drone and queen trap, looking to the right, as indicated by the arrow A in Fig. 1, omitting the hive. Fig. 3 is a fragmentary view in elevation showing part of the door of the trap or catch apparatus.

Like letters of reference mark the same parts wherever they occur in the several figures of the drawings.

Referring to the drawings by letters, $e$ indicates a hive of any approved construction, provided in one wall, near the bottom, with a swarm-hole, as usual in hives.

$c$, $b$, and $f$ indicate the several compartments of the trap or catch apparatus arranged one above the other in the order named, $c$ being the lowest and being provided with a spout or inlet $d$ to be inserted in the swarm-hole of the hive, as shown in Fig. 1, when the bees are swarming.

$b$ is the queen and drone trap, and $f$ the swarm-trap, the former being next above the trap-compartment $c$ and having communication therewith, as indicated by the arrows. The compartment $c$ has a door in which the spout $d$ is secured, the door being hinged at its upper edge.

The swarm-trap $f$ is above the queen and drone trap, has communication therewith through an opening, as indicated by the arrow therein, and has a latticed side $g$ next to the hive and air-hole $h$ in the top covered with lattice or open work.

A trap-board $i$ is pivoted intermediate its ends in front of the swarm-hole and may be arranged, as shown in Fig. 1, to cause the bees leaving the hive to pass upward, as indicated by the arrow leading from the swarm-hole, or to pass out in the direction indicated by the horizontal arrows, (in dotted lines,) if so desired, the trap-board being held in either position by means of a spring-latch located in a vertical slot in a hinged side $a$ of the compartment $c$, as shown in Figs. 1 and 2.

The opening between the compartment $c$ and the queen and drone trap compartment $b$ is sufficiently large to permit of the passage of the whole swarm; but the opening between compartments $b$ and $f$ is large enough to permit of the passage of the workers, but not large enough to allow the drones and queen to pass, so that these latter are confined in compartment $b$, while the workers pass on into compartment $f$.

When the drones and queen are trapped, the compartment $b$ may be removed, if desired, and the compartment $f$ let down upon the compartment $c$.

Having thus fully described my invention, what I claim as new, and desire to secure by Letters Patent of the United States, is—

1. A bee-swarm catcher comprising a lower trap-compartment communicating with the hive and provided with an exit-opening in line with such communication, a trap-board pivoted intermediate its ends in said compartment, and means for securing said trap-board in position to permit, or to prevent, respectively, the passage of the bees through said exit, substantially as described.

2. A bee-swarm catcher comprising a lower trap-compartment communicating with the hive and provided with an exit-opening in line with such communication, a trap-board pivoted intermediate its ends in said compartment, a hinged side to said compartment having a vertical slot, and a spring-latch in said slot whereby the trap-board may be held in position to permit or prevent the passage of the bees through said exit, substantially as described.

3. A bee-swarm catcher comprising a lower compartment, an intermediate queen and drone compartment, and an upper compartment, the lower compartment communicating with the hive and with the intermediate compartment by openings to permit the passage of the whole swarm and the intermediate and upper compartments communicating by means of openings to permit of the workers only, the lower compartment having an exit-opening in line with its communication with the hive, a trap-board pivoted in the lower compartment, and means whereby said trap-board may be set and held in position to permit, or prevent, the passage of the swarm through said exit, substantially as described.

In testimony whereof I affix my signature in presence of two witnesses.

ERNST STEMMLER.

Witnesses:
F. STEPHAN,
A. BROIUTIGAM.